(12) United States Patent
Adachi

(10) Patent No.: US 6,223,554 B1
(45) Date of Patent: May 1, 2001

(54) COMPRESSOR PROVIDED WITH REFRIGERANT AND LUBRICANT IN SPECIFIED RELATIONSHIP

(75) Inventor: Toru Adachi, Kusatsu (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/433,282

(22) Filed: Nov. 3, 1999

Related U.S. Application Data

(62) Division of application No. 08/843,073, filed on Apr. 11, 1997, now Pat. No. 6,026,649.

(30) Foreign Application Priority Data

Apr. 11, 1996 (JP) .................................................... 8-089229

(51) Int. Cl.$^7$ ............................. F25B 43/02; C09K 5/00
(52) U.S. Cl. ........................... 62/468; 29/888.02; 252/68
(58) Field of Search ............................... 62/84, 114, 468; 252/68; 29/888.02

(56) References Cited

U.S. PATENT DOCUMENTS

| 5,372,737 | 12/1994 | Spauschus ............................... 252/68 |
| 5,419,144 | 5/1995 | Kawaguchi et al. ....................... 62/84 |
| 5,600,959 | 2/1997 | Gay et al. .................................. 62/84 |

FOREIGN PATENT DOCUMENTS 5-157379   6/1993   (JP) .

*Primary Examiner*—William Wayner
(74) *Attorney, Agent, or Firm*—Wenderoth, Lind & Ponack, L.L.P.

(57) ABSTRACT

The present invention provide a compressor in which an oil for application or that for assembly has non-compatibility with a refrigerant to be charged in a refrigerant circuit and an lubricating oil to be charged in the compressor has compatibility with the refrigerant.

3 Claims, 3 Drawing Sheets

COMPRESSOR PROVIDED WITH REFRIGERANT AND LUBRICANT IN SPECIFIED RELATIONSHIP

This is a divisional of Ser. No. 08/843,073, filed Apr. 11, 1997, now U.S. Pat. No. 6,026,649.

BACKGROUND OF THE INVENTION

1. Field of the Invention

The present invention relates to a refrigerant compressor applied to, for example, an air conditioner.

2. Description of the Prior Art

An example of an compressor is shown in FIG. 1. The compressor shown in FIG. 1 is the one for air conditioner for car. FIG. 1(a) is a sectional view of the compressor. FIG. 1(b) is a sectional view of compressing-mechanism system. The compressing-mechanism system is constituted mainly of a cylinder 14 (made of iron), a side plate 13 (made of aluminum) for sealing the cylinder 14, an O-ring 15 for improving the sealing between the cylinder 14 and the side plate 13, a rotor rotating in the cylinder 14 to compress refrigerant, and a vane 11 (made of aluminum). The rotor 12 rotates as a rotating shaft 20 supported on a needle bearing 19 rotates.

Such a compressor as having the above compressing-mechanism is assembled after an oil for application is applied in advance to the vane 11, the O-ring 15 and a lip seal 16 etc. After the assemble of the compressor is finished, about 5 cc of an oil for assemble is poured through an intake inlet 17 and enclosed. This oil for assemble is supposed to flow around sliding portions in the compressor, such as a sliding portion between the vane 11 and the side plate 13, a sliding portion between the vane 11 and the cylinder 14, a sliding portion between the rotor 12 and the side plate 13, a sliding portion between the rotor 12 and the cylinder 14, and a sliding portion between the rotating shaft 20 and the needle bearing 19. These sliding portions are indicated by the reference number 3 in FIG. 1. A lubricating oil 2 is poured through an outlet 18 and enclosed in the compressor In such a compressor, an oil for applying too parts of the compressor and that for assembly have the same basic ingredients as a lubricating oil to be charged in the compressor. A compatible oil having compatibility with a refrigerant has been used for both this lubricating oil and the oil for application or assembly.

Some techniques use non-compatible oils for the lubricating oil and the oil for application or assembly, which do not have compatibility with a refrigerant, as disclosed in, for example, Japanese Patent Laid-Open Hei 5-157379.

However, the constitution using the above-mentioned compatible oil raises the following problem, for example. The compressor is installed in a car to form such a refrigerant circuit as shown in FIG. 2. When the car is left under a burning sun in summer, the temperature of evaporator 5 in the car room goes up higher than that of the compressor 1 and a condenser 4 outside the car room in the daytime. The refrigerant is condensed in the compressor 1 and the condenser 4. The refrigerant dissolves in the lubricating oil particularly well. Then, the sun sets and the temperature difference between the inside and outside of the car disappears. The lubricating oil dissolved in the refrigerant moves from the compressor 1 to the evaporator 5 etc. together with the refrigerant. When this phenomenon is repeated, the lubricating oil goes out of the compressor 1 to move and be held in the condenser 4 and the evaporator 5 etc. in the refrigerant circuit shown in FIG. 2. Thus, there arises a problem that a failure in lubricity occurred when starting the compressor 1 because of a shortage of the lubricating oil.

Further, under the constitution using a non-compatible oil, the oil discharged into the refrigerant circuit from the compressor 1 remains in the refrigerant circuit without returning to the compressor 1 together with the refrigerant even when the refrigerant was circulated, because the oil does not have compatibility with the refrigerant. Therefore, there arises a problem that a shortage of the lubricating oil in the compressor 1 and abnormal wear particularly at the sliding portions 3 occurred to degrade durability of the compressor 1.

In the refrigerant circuit using an open system compressor 1, such an air conditioner for car, two-phase separation between oil and refrigerant occurs when the refrigerant is in short and milkiness is observed at the side glass part 7 of the dryer receiver 6 as shown in FIGS. 3(a) and (b). At this time, when the shortage of the refrigerant is supplemented and the required amount of refrigerant is supplied in the refrigerant circuit, the milkiness disappears. Accordingly, the milkiness phenomenon is one of standards on whether the refrigerant should be supplemented.

However, when using a non-compatible oil or a mixture of a compatible oil and a non-compatible oil, two-phase separation of the non-compatible oil from the refrigerant occurs in the refrigerant circuit.

Therefore, even if a suitable amount of the refrigerant is charged in the refrigerant circuit, milkiness is always observed due to the two-phase separation at the side glass part 7 of the dryer receiver 6 to cause a mistake about a shortage of the refrigerant. As a result, this mistake may lead to unnecessary supplement of the refrigerant, resulting in a problem of excess supplement of the refrigerant.

SUMMARY OF THE INVENTION

An object of the present invention is to provide a compressor with high lubricity and improved durability, which can construct a refrigerant circuit with high reliability.

Another object of the present invention is to provide an open-system compressor which can be prevented from excess charging of the refrigerant.

The present invention relates to a compressor in which an oil for applying to parts or that for assembly has non-compatibility with a refrigerant to be charged in a refrigerant circuit and an lubricating oil to be charged in the compressor has compatibility with the refrigerant.

DETAILED DESCRIPTION OF THE INVENTION

Figure 1A:
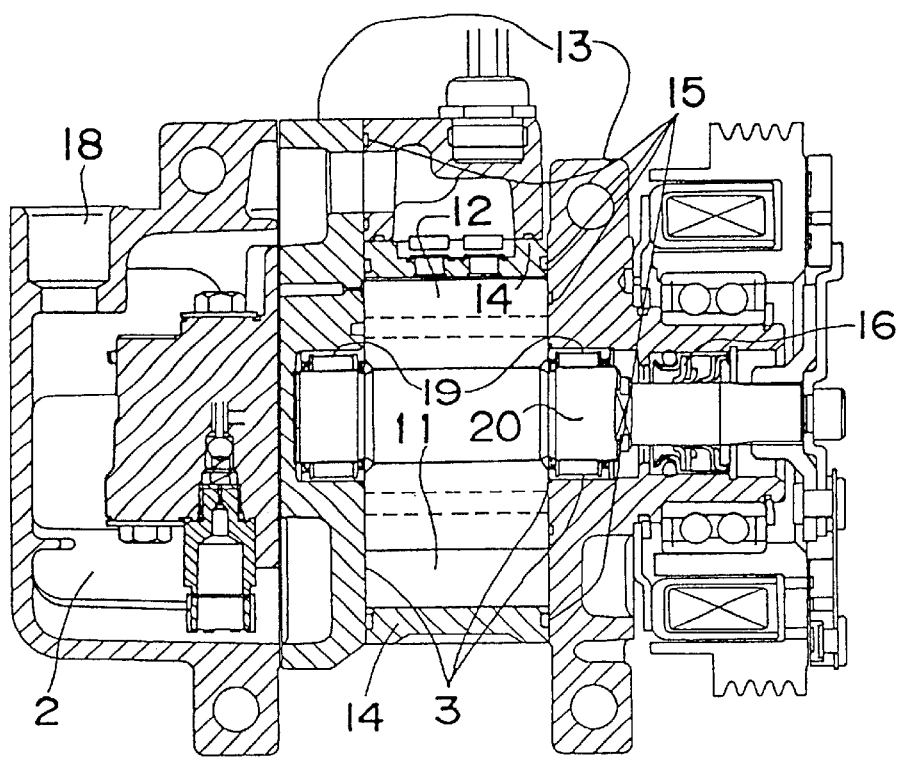
FIG. 1(a) is a sectional view of compressor.

The present invention provides a compressor which is characterized in that an oil for assembly has non-compatibility with a refrigerant charged in a refrigerant circuit.

The present invention also provides a compressor which is characterized in that an oil for application or assembly has non-compatibility with a refrigerant charged in a refrigerant circuit, and that a lubricating oil charged in the compressor has compatibility with the above-mentioned refrigerant.

In the present invention, the term "compatibility" means that a refrigerant and an oil do not separate into two phases in a wide rage of temperature. For example, in the case of an air conditioner for car, the term "compatibility" means that a two-phase separation does not occur at a temperature between –30° C. and 60° C. The term "non-compatibility" or "incompatibility" means that a refrigerant and an oil separates into two phases in a wide rage of temperature. For example, in the case of an air conditioner for car, the term "non-compatibility" or "incompatibility" means that a two-phase separation occurs at a temperature between –30° C. and 60° C.

The refrigerant used in the present invention is exemplified by fluorine refrigerants, hydrocarbon refrigerants and natural-type refrigerants. The fluorine refrigerants are exemplified by chlorofluorocarbon (CFC), such as trichlorofluoromethane ($CCl_3F$) (F-11) and dichlorodifluoromethane ($CCl_2F_2$) (F-12), hydrochlorofluorocarbon (HCFC), such as difluorochloromethane ($CHF_2Cl$), hydrofluorocarbon (HFC) which contains no chlorine atom, such as 1,1,2,2,-tetrafluoroethane (R134a) and HFC32/125 refrigerant mixture (R410A), HFC32/125/134a refrigerant mixture (R407C). The hydrocarbon refrigerant may be exemplified by hydrocarbons, such as propane, butane, and pentane. The natural-type refrigerant may be exemplified by $CO_2$ and $NH_3$.

When the hydrofluorocarbon (HFC) which contains no chlorine atom is used as a refrigerant, it is preferable that polyalkylene glycol oil and ester oil are used as the lubricant, and that hard alkyl benzene oil, soft alkyl benzene oil, poly-α-olefin oil, paraffin mineral oil, naphthene mineral oil and ester oil are used as the oil for application or assembly in combination.

More preferably, R134a (refrigerant), polyalkylene glycol (lubricant) and hard alkyl benzene (oil for application or assembly), or R134a (refrigerant), polyalkylene glycol (lubricant) and paraffin oil (oil for application or assembly) are used in combination.

As polyalkylene glycol, mono-, di- and tri-ol type, and modified polyalkylene glycol may be used. Mono-, di- and tri-ol type is preferable.

In the compressor of the present invention, as the oil for application or assembly does not have compatibility with the refrigerant, the oil for application or assembly does not go out of the compressor.

Further, in the compressor of the present invention, as the oil for application or assembly does not have compatibility with the refrigerant and the lubricating oil to be charged in the compressor has compatibility with the refrigerant, the oil for application or assembly does not dissolve in the refrigerant and does not go out of the compressor.

For the above reason, even if the lubricating oil goes out of the compressor together with the refrigerant, the oil for application or assembly remains in the compressor, a failure in lubricity of the compressor does not occur at starting.

Moreover, two-phase separation from the refrigerant does not happen. Therefore, even if it is used for an open type compressor such as a car air conditioner, a problem, such as excess charging of refrigerant caused from mistake of milkiness, does not occur.

The compressor used in an air conditioner for car is explained in the above, but it should be noted that the technical idea of the present invention can be applied to other types of compressors in a similar manner.

EXAMPLES

Examples of the present invention are explained referring to figures as follows.

Figure 1B:
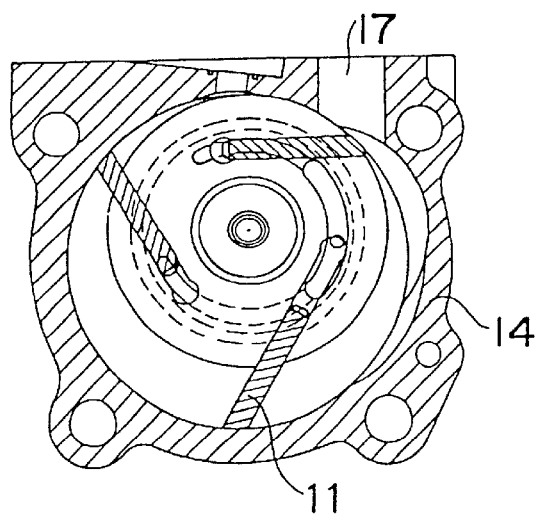
FIG. 1(b) is a sectional view of compressing mechanism system.

A schematic sectional view of the compressor used in the Examples is shown in FIG. 1.

EXAMPLE 1

In this Example, a compressor having the construction shown in FIG. 1 and used in the system of an air conditioner for car is used. The compressor 1 is charged with R134a as the refrigerant. The lubricating oil to be charged in the compressor 1 is polyalkylene glycol. The oil for applying to the sliding portions and that for assembly is a hard alkylbenzene oil. The hard alkyl benzene is the intake inlet 17 of the compressor 1 as an oil for assembly and exists around the sliding portions. The oil for-application is applied to vane 11, O-ring 15, lip seal 16.

In the above-mentioned compressor 1, the hard alkylbenzene oil, which has non-compatibility with R134a, is applied in advance as the oil for applying to the sliding portions 3 and that for assembly. Therefore it remains in the compressor 1 without dissolving in R134a and not going out of the compressor 1.

Accordingly, the hard alkylbenzene oil functions as an oil required for lubricating the sliding portions 3, thereby enhancing lubricity of the compressor 1 at starting.

In this Example, the hard alkylbenzene oil is used as the oil for applying to the sliding portions 3 and that for assembly in order to improve lubricity of the compressor 1 at starting. Other oils which have non-compatibility with the refrigerant, such as a soft alkylbenzene oil, a poly-α-olefin oil, a paraffine mineral oil and a naphthene mineral oil is used alone or in combination thereof, resulting in similar effects.

EXAMPLE 2

In this Example, a compressor having the construction shown in FIG. 1 and used in the system of an air conditioner for car is used. The compressor 1 is charged with R134a as the refrigerant, the oil for application is a hard alkylbenzene oil, and the lubricating oil to be charged in the compressor 1 is a polyalkylene glycol oil. The hard alkylbenzene is applied to the parts in FIG. 1, such as the vane 11, O-ring 15 and lip seal 16.

In the above-mentioned compressor 1, the lubricating oil charged in the compressor 1 has compatibility with the refrigerant. Thus, depending on conditions for using it, even if the polyalkylene glycol oil dissolves in the refrigerant and moves outside of the compressor 1 to remain in the condenser 4 or the evaporator 5 in the refrigerant circuit, the alkylbenzene oil as the oil for application does not dissolve in the refrigerant and remains in the compressor 1 to works as an oil necessary for lubricity of the sliding portions 3, thereby improving the lubricity of the compressor 1.

In this Example, in order to prevent a shortage of the oil necessary for lubricity in the compressor 1, the hard alkylbenzene oil is used as the oil for application. Other oils having non-compatibility with the refrigerant, such as a soft alkylbenzene oil, a poly-α-olefin oil, a paraffine mineral oil and a naphthene mineral oil, can be used alone or in combination thereof, resulting in similar effects.

Further, in this Example, ester oils can be used as the lubricating oil to be charged in the compressor 1 instead of the polyalkylene glycol oil, resulting in similar effects.

EXAMPLE 3

Figure 2:
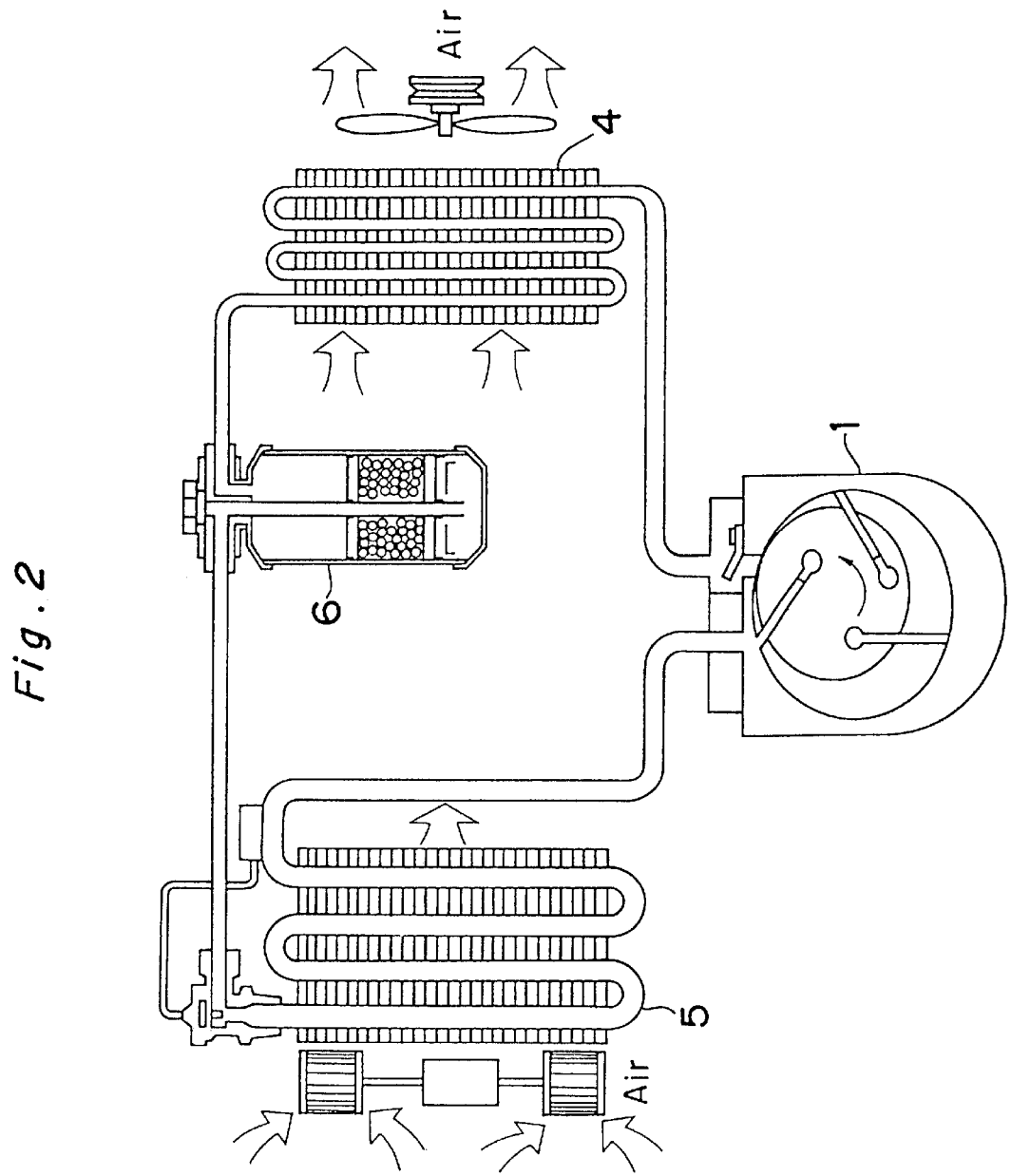
FIG. 2 is a circuit diagram showing a refrigerant circuit of an air conditioner for car.
Figure 3A:
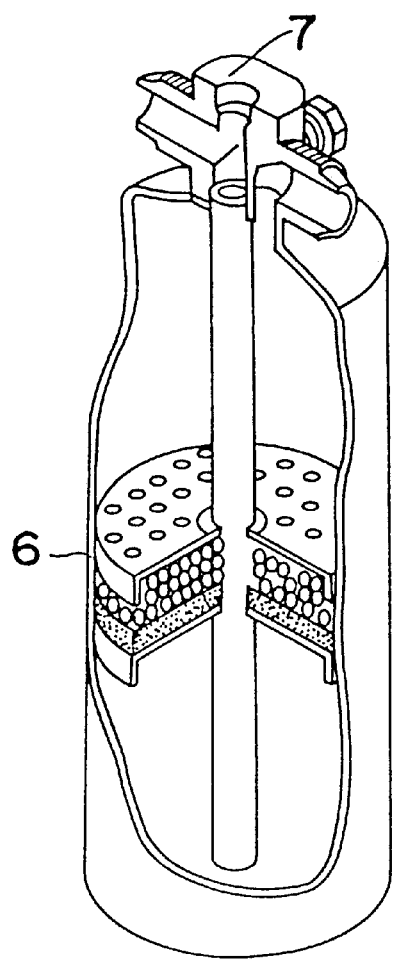
FIG. 3(a) is a perspective view of a dryer receiver.
Figure 3B:
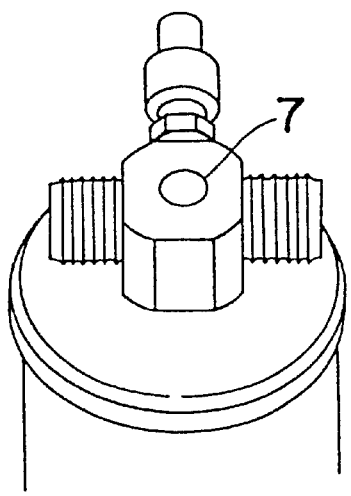
FIG. 3(b) is an enlarged perspective view of side glass part of dryer receiver.

In this Example, a compressor used in the system of an air conditioner for car, which is shown in FIG. 2, is used. The compressor has the same construction as that shown in FIG. 1. The compressor 1 is charged with R134a as the refrigerant, the oil for application and that for assembly is a hard alkylbenzene oil, and the lubricating oil to be charged in the compressor 1 is a polyalkylene glycol oil. The hard alkylbenzene oil exists around the sliding portions 3 formed of the vane 11, the rotor 12, the side plate 13 and the cylinder 14.

In the above-mentioned compressor 1, different oils: the hard alkylbenzene oil having non-compatibility with the refrigerant and the polyalkylene glycol oil having compatibility with the refrigerant are used. Since the hard alkylbenzene oil is used as the oil for application or assembly, the amount to be used is very small in comparison with that of the polyalkylene glycol oil as the lubricating oil, therefore two-phase separation from the refrigerant does not occur.

Accordingly, even if they are used for an open type compressor 1 which is used for the car air conditioner and the like, milkiness at the side glass part 7 of the dryer receiver 6 does not occur, and an excess charging of the refrigerant due to misapprehension can be prevented.

In this Example, the hard alkylbenzene oil is used as the oil for application in order to prevent excess charging of the refrigerant. Other oils having non-compatibility with the refrigerant, such as a soft alkylbenzene oil, a poly-α-olefin oil, a paraffine mineral oil and a naphthene mineral oil can be used or in combination thereof, resulting in a similar effects.

EXAMPLE 4

In this Example, a compressor having the construction shown in FIG. 1 and used in the system of an air conditioner for car is used. The compressor 1 is charged with R134a as the refrigerant, the oil for application and that for assembly is a paraffin mineral oil, and the lubricating oil to be charged in the compressor 1 is a polyalkylene glycol oil. The paraffin mineral oil is applied to parts in FIG. 1, such as the vane 11, the O-ring 15 and the lip seal 16.

In the assembly process of the above-mentioned compressor 1, the paraffine mineral oil and the polyalkylene glycol oil are used separately. Therefore, it is not necessary to mix the paraffine mineral oil with the polyalkylene glycol oil in the process of oil preparation.

Thus, it becomes unnecessary to control moisture, temperature, pressure and the like for control of products, in the process of oil preparation. Even if different oils, such as a paraffine mineral oil as the non-compatible oil and a polyalkylene glycol oil as the compatible oil are not mixed, the different oils are charged in the compressor 1.

Further, in this Example, the polyalkylene glycol oil is used as the lubricating oil of the compressor 1. Ester oils can be also used instead, resulting in similar effects.

Furthermore, in this Example, the paraffine mineral oil is used as the oil for application or assembly of the compressor 1. Other oils such as a hard alkylbenzene oil, a soft alkylbenzene oil, a poly-α-olefin oil, a naphthene mineral oil and the like can be used instead, resulting similar results.

EXAMPLE 5

In this Example, a compressor having the construction shown in FIG. 1 and used in the system of an air conditioner for car is used. The compressor 1 is charged with R134a as the refrigerant, the oil for assembly is a hard alkylbenzene oil, and the lubricating oil 2 to be charged in the compressor 1 is a polyalkylene glycol oil. The hard alkylbenzene exists around the sliding portions 3 formed of the vane 11, the rotor 12, the side plate 13 and the cylinder 14.

In the sliding portions 3 of the above-mentioned compressor 1, the alkylbenzene oil as the oil for assembly imparts the characteristic lubricity to sliding portions between a part made of iron and that made of aluminum. In addition to that, the polyalkylene glycol oil as the lubricating oil imparts the characteristic lubricity to sliding portions between parts made of iron. Therefore, the lubricity of the compressor 1 is improved, compared to the case where one kind of oils is used.

Further, in this Example, the polyalkylene glycol oil is used as the lubricating oil. Other oils, such as ester oils may be used, resulting in similar effects.

Furthermore, in this Example, R134a is used as the refrigerant. Other refrigerants, such as R410A and R407C are used, resulting in similar results.

Even if a character of the refrigerant changes, a similar effect can be obtained as far as the oils used in the above-mentioned respective examples maintain the similar relation with the refrigerant.

Here, we provide a compressor which is characterized in that an oil for applying to sliding portions or that for assembly has non-compatibility with a refrigerant to be charged in a refrigerant circuit.

As is apparent from the above-mentioned examples, the oil for applying to the sliding portions or that for assembly does not have compatibility with the refrigerant to be charged in the refrigerant circuit, thereby, it does not happen that the oil for application or that for assembly dissolves in the refrigerant and goes out of the compressor.

That is, since the oil for application or that for assembly functions as an oil necessary for lubrication of the sliding portions of the compressor, lubricity of the compressor at starting is improved.

Further, we provide a compressor which is characterized in that an oil for applying to sliding portions or that for assembly has non-compatibility with a refrigerant to be charged in a refrigerant circuit and a lubricating oil to be charged in the compressor has compatibility with the above-mentioned refrigerant. The oil for application or that for assembly has non-compatibility with the refrigerant to be charged in the refrigerant circuit and the lubricating oil to be charged in the compressor has compatibility with the above-mentioned refrigerant. Thereby, the oil for application or that for assembly does not dissolve in the refrigerant, even if the lubricating oil dissolves in the refrigerant and goes out of the compressor. It functions as an oil necessary for lubrication at the sliding portions, therefore a failure in lubrication of the compressor does not occur at starting.

Moreover, only a very small amount of the oil for application or that for assembly is used in comparison with that of the lubricating oil, therefore two-phase separation from the refrigerant does not occur. Accordingly, in an open type compressor used in a air conditioner for car, milkiness at the side glass part is not observed, therefore a misjudgment, such as excess charging of the refrigerant is not made.

Also, when a mixture of different oils is used as the lubricating oil, control on the process of oil manufacturing for product control becomes complicated. However, such control is not necessary because the oil for application or that for assembly and the lubricating oil are individually used in the assembling process of the compressor.

Further, by using different types of oils, such as a compatible oil and a non-compatible oil, it is possible to make the most of the lubricity which is characteristic of the compatible oil and the non-compatible oil, resulting in improvement of the compressor.

What is claimed is:

1. A refrigerant circuit, comprising:

a compressor including sliding portions;

an evaporator;

a dryer receiver; and a condenser;

a refrigerant and a lubricating oil compatible with the refrigerant being circulating in the circuit;

in which the sliding portions have applied thereto an oil non-compatible with the refrigerant, said oil having been applied with the compressor was assembled.

2. The refrigerant circuit of claim 1, in which the oil applied to sliding portions for assembly of said compressor is a hard alkyl benzene oil, the lubricating oil is a polyalkylene glycol oil and refrigerant is hydrofluorocarbon.

3. The refrigerant circuit of claim 1, in which the oil applied to said sliding portions for assembly of said compressor is a hard alkyl benzene oil, the lubricating oil is a polyalkylene glycol oil and refrigerant is R134a.

* * * * *